(12) United States Patent
Koyama (10) Patent No.: US 7,791,639 B2
(45) Date of Patent: *Sep. 7, 2010

(54) CONTROL APPARATUS, VIDEO PROCESSING APPARATUS, AND CONTROL METHOD THEREOF

(75) Inventor: Shin-ichi Koyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 671 days.

This patent is subject to a terminal disclaimer.

(21) Appl. No.: 11/046,822

(22) Filed: Feb. 1, 2005

(65) Prior Publication Data

US 2005/0134690 A1    Jun. 23, 2005

Related U.S. Application Data

(63) Continuation of application No. PCT/JP2004/018974, filed on Dec. 14, 2004.

(30) Foreign Application Priority Data

Dec. 17, 2003    (JP) .............................. 2003-420201

(51) Int. Cl.
  H04N 5/225    (2006.01)
  H04N 5/232    (2006.01)
  H04N 9/79     (2006.01)
  G06F 3/00     (2006.01)
(52) U.S. Cl. .................... 348/207.1; 348/211.1; 710/14; 386/35
(58) Field of Classification Search ............... 386/69, 386/35; 710/10, 14–19, 5; 370/282; 348/207.99, 348/207.1
See application file for complete search history.

(56) References Cited

U.S. PATENT DOCUMENTS 5,907,660 A  *  5/1999  Inoue et al. .................. 386/109

(Continued)

FOREIGN PATENT DOCUMENTS

CN    1264973 A    8/2000

(Continued)

OTHER PUBLICATIONS

TA Document 1999026, AV/C Digital Interface Command Set General Specification Version 4.0, 1394 Trade Association, Jul. 23, 2001, pp. 1-105.

(Continued)

*Primary Examiner*—Nhan T Tran
(74) *Attorney, Agent, or Firm*—Fitzpatrick, Cella, Harper & Scinto (57) ABSTRACT

A video processing apparatus includes an output terminal, a reception unit and a control unit. The reception unit receives one of a first command and a second command from a control apparatus, wherein the first command is for locking a data format of data output from the output terminal to a predetermined data format, and the second command is for not locking the data format of the data output from the output terminal to the predetermined data format. The control unit controls to lock the data format of the data output from the output terminal to the predetermined data format, if the first command is received by the reception unit. The control unit controls not to lock the data format of the data output from the output terminal to the predetermined data format, if the second command is received by the reception unit.

4 Claims, 7 Drawing Sheets

U.S. PATENT DOCUMENTS

| | | | |
|---|---|---|---|
| 6,788,653 B1 * | 9/2004 | Sakamoto et al. | 370/282 |
| 6,833,863 B1 * | 12/2004 | Clemens | 348/220.1 |
| 7,032,059 B1 * | 4/2006 | Yamada et al. | 710/10 |
| 7,624,200 B2 * | 11/2009 | Koyama | 710/5 |
| 7,624,201 B2 * | 11/2009 | Koyama | 710/5 |
| 2004/0131340 A1 * | 7/2004 | Antoun et al. | 386/125 |

FOREIGN PATENT DOCUMENTS

| | | |
|---|---|---|
| CN | 1274230 A | 11/2000 |
| EP | 1052574 A2 | 11/2000 |
| EP | 1441535 A2 | 7/2004 |
| JP | 2000-215598 A | 8/2000 |
| JP | 2000-324143 | 11/2000 |
| JP | 2001-275076 A | 10/2001 |
| JP | 2004-228757 | 8/2004 |

OTHER PUBLICATIONS

IEC 61883-1, Consumer audio/video equipment—Digital interface—Part 1 General, First edition, Feb. 1998, pp. 1-83.

AV/C Digital Interface Command Set General Specification Version 3.0 [online]. 1394 Trade Association, Apr. 15, 1998. [retrieved on Apr. 28, 2000]. Retrivd from the Internet: <URL:http://www.1394ta.org>, pp. 35, 44-46.

AV/C Tape Recorder/Player Subunit Specification Version 2.1 [online]. 1394 Trade Association, Jan. 26, 1999. [retrieved on Apr. 28, 2000]. Retrieved from the Internet: <URL:http://www.1394ta.org>, pp. 13, 14, 34, 35, 43.

Enhancements to the AV/C Tape Recorder/Player Subunit Specification Version 2.1 [online]. 1394 Trade Association, Oct. 5, 1999. [retrieved on Jul. 25, 2000]. Retrieved from the Internet: <URL:http://www.1394ta.org>.

Universal Serial Bus Specification, Revision 2.0, Apr. 27, 2000.

Oct. 17, 2008 Chinese Official Action in Chinese Patent Appln. No. 200480041824.8 (with translation).

Jun. 29, 2010 Japanese Official Action in Patent Appln. No. 2003-420201.

* cited by examiner

| OPECODE | OUTPUT PLUG SIGNAL MODE | | |
|---|---|---|---|
| OPERAND(0) | 0x01 | | |
| OPERAND(1) | LOCK | FORMAT | PLUG NUMBER |

FIG. 5

| OPECODE | INPUT PLUG SIGNAL MODE | | |
|---|---|---|---|
| OPERAND(0) | 0x01 | | |
| OPERAND(1) | LOCK | FORMAT | PLUG NUMBER |

FIG. 7

CONTROL APPARATUS, VIDEO PROCESSING APPARATUS, AND CONTROL METHOD THEREOF

This application is a continuation application of pending Application No. PCT/JP2004/018974, filed Dec. 14, 2004.

TECHNICAL FIELD

The present invention relates to a video processing apparatus which outputs data in a plurality of kinds of data formats from one digital interface, a control apparatus which controls the video processing apparatus, and so on.

BACKGROUND ART

For example, Japanese Patent Laid-Open No. 2001-275076 proposes a method of recording HD (High Definition) video data based on MPEG2 standard on a magnetic tape on which video data based on DV (Digital Video) standard developed by the HD Digital VCR Conference should be recorded.

However, for example, when a magnetic tape with data recorded in a plurality of data formats is played back, a control apparatus which wants to receive only one format cannot lock the data format to be output to the desired data format.

DISCLOSURE OF INVENTION

It is an object of the present invention is to overcome the above-described drawbacks. For example, it is an object of the present invention to provide an apparatus and a method which execute control to lock or not to lock the data format of output data output from one of output means of a video processing apparatus or input data input to one of input means to one data format.

According to the first aspect of the present invention, there is provided a control apparatus which controls a video processing apparatus or a control method thereof, comprising command generation means or a step of generating a command to lock a data format of output data output from one of output means of the video processing apparatus to a predetermined data format, and transmission means or a step of transmitting the command to the video processing apparatus.

According to the second aspect of the present invention, there is provided a control apparatus which controls a video processing apparatus or a control method thereof, comprising command generation means or a step of generating a command not to lock a data format of output data output from one of output means of the video processing apparatus to a predetermined data format, and transmission means or a step of transmitting the command to the video processing apparatus.

According to the third aspect of the present invention, there is provided a control apparatus which controls a video processing apparatus or a control method thereof, comprising command generation means or a step of generating a command to lock a data format of input data input to one of input means of the video processing apparatus to a predetermined data format, and transmission means or a step of transmitting the command to the video processing apparatus.

According to the fourth aspect of the present invention, there is provided a control apparatus which controls a video processing apparatus or a control method thereof, comprising command generation means or a step of generating a command not to lock a data format of input data input to one of input means of the video processing apparatus to a predetermined data format, and transmission means or a step of transmitting the command to the video processing apparatus.

According to the fifth aspect of the present invention, there is provided a video processing apparatus controlled by a control apparatus or a control method thereof, comprising reception means or a step of receiving a command transmitted from the control apparatus, and control means or a step of, when the command is a command to lock a data format of output data output from one of output means of the video processing apparatus to a predetermined data format, executing control to lock the data format of the output data output from the output means to the predetermined data format.

According to the sixth aspect of the present invention, there is provided a video processing apparatus controlled by a control apparatus or a control method thereof, comprising reception means or a step of receiving a command transmitted from the control apparatus, and control means or a step of, when the command is a command not to lock a data format of output data output from one of output means of the video processing apparatus to a predetermined data format, executing control not to lock the data format of the output data output from the output means to the predetermined data format.

According to the seventh aspect of the present invention, there is provided a video processing apparatus controlled by a control apparatus or a control method thereof, comprising reception means or a step of receiving a command transmitted from the control apparatus, and control means or a step of, when the command is a command to lock a data format of input data input to one of input means of the video processing apparatus to a predetermined data format, executing control to lock the data format of the input data input to one of the input means to the predetermined data format.

According to the eighth aspect of the present invention, there is provided a video processing apparatus controlled by a control apparatus or a control method thereof, comprising reception means or a step of receiving a command transmitted from the control apparatus, and control means or a step of, when the command is a command not to lock a data format of input data input to one of input means of the video processing apparatus to a predetermined data format, executing control not to lock the data format of the input data input to one of the input means to the predetermined data format.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BEST MODE FOR CARRYING OUT THE INVENTION

The preferred embodiment of the present invention will be described below with reference to the accompanying drawings. In this embodiment, data containing video data, audio data, and their additional data will be referred to as "AV data". An apparatus capable of inputting or outputting AV data in a plurality of kinds of data formats through a digital interface will be referred to as a "video processing apparatus". An apparatus having a function of controlling the video processing apparatus will be referred to as a "control apparatus". Hence, the video processing apparatus according to this embodiment includes a digital camera, digital video camera, cellular phone with a camera, and digital video recorder. The control apparatus includes a personal computer, portable computer, and digital TV broadcast receiving apparatus. In this embodiment, a data format based on DV standard will be referred to as a "DV format", AV data based on DV standard as "DV data", a data format based on MPEG2 standard as an "MPEG2 format", and AV data based on MPEG2 standard as "MPEG2 data".

Figure 1:
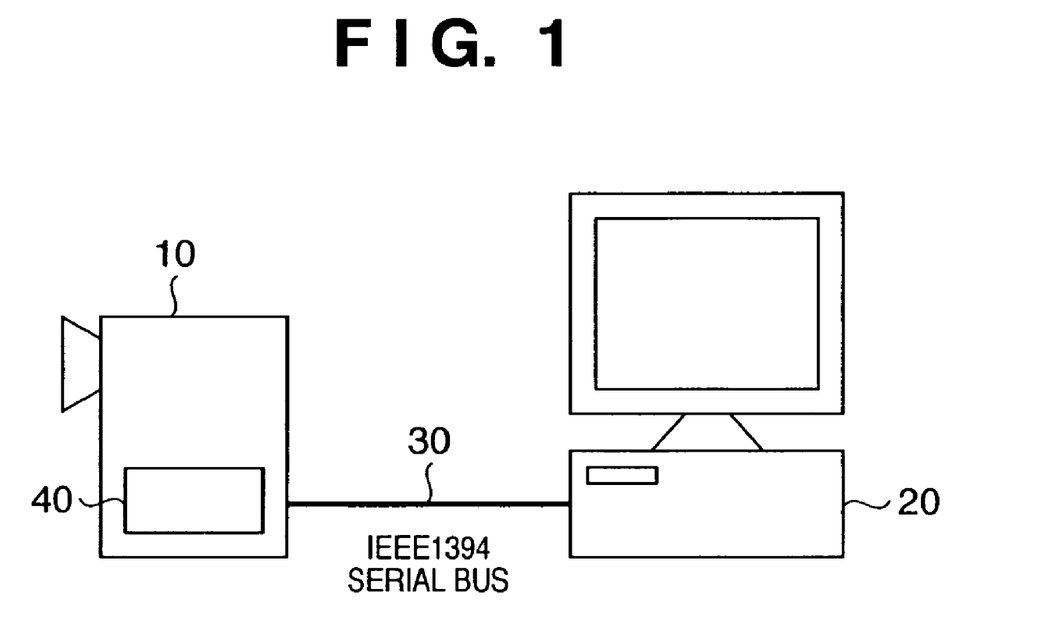
FIG. 1 is a view for explaining the arrangement of a control system according to the embodiment.

The arrangement of a control system according to this embodiment will be described first with reference to FIG. 1. Referring to FIG. 1, reference numeral 10 denotes a DVC (Digital Video Camera) as an example of the video processing apparatus according to this embodiment; and 20, a PC (Personal Computer) as an example of the control apparatus according to this embodiment. An IEEE 1394 serial bus 30 is an example of a transmission medium which connects the DVC 10 and PC 20. The DVC 10 and PC 20 are connected to the IEEE 1394 serial bus 30 through IEEE 1394 interfaces. A recording medium 40 can be attached to the video processing apparatus. In this embodiment, the recording medium 40 is a magnetic tape. However, the recording medium 40 is not limited to a magnetic tape, as a matter of course.

Figure 2:
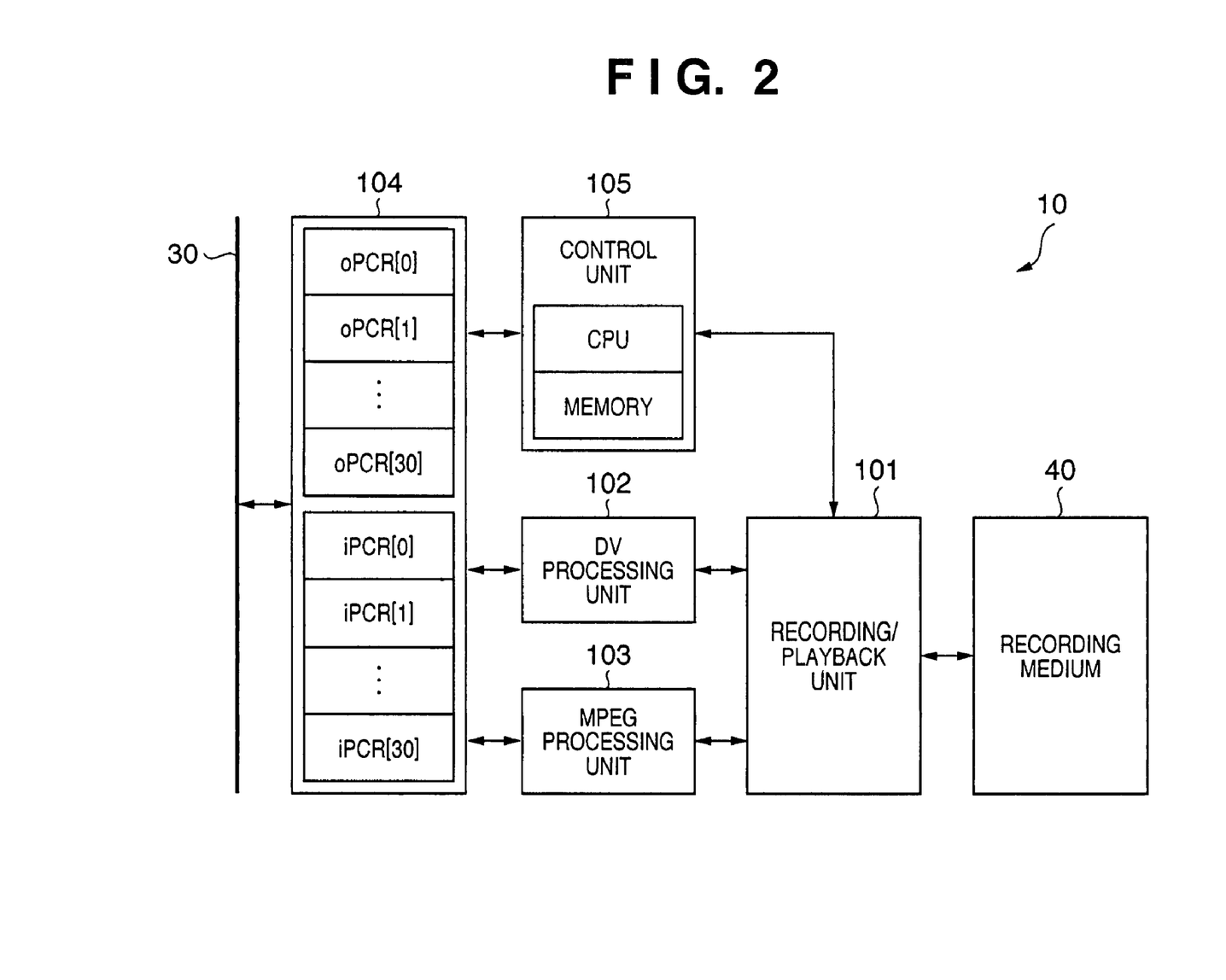
FIG. 2 is a view for explaining the major components of a digital video camera as an example of a video processing apparatus according to the embodiment.

The major components of the DVC 10 as an example of the video processing apparatus according to this embodiment will be described next with reference to FIG. 2. A recording/playback unit 101 has a playback function of playing back data recorded on the recording medium 40 and a recording function of recording input data on the recording medium 40. A DV processing unit 102 processes DV data. An MPEG processing unit 103 processes MPEG2 data. An IEEE 1394 interface 104 can communicate with the IEEE 1394 interface of the PC 20. The IEEE 1394 interface 104 has 31 oPCRs (output Plug Control Registers) and 31 iPCRs (input Plug Control Registers). An oPCR is a logical output terminal defined by IEC 61883-1. An iPCR is a logical input terminal defined by IEC 61883-1. A control unit 105 has a CPU and a memory which stores programs (including a program to control the DVC 10) executable by the CPU.

In this embodiment, DV data played back from the recording medium 40 is transmitted to the PC 20 through the DV processing unit 102 and at least one OPCR. MPEG2 data played back from the recording medium 40 is transmitted to the PC 20 through the MPEG processing unit 103 and at least one OPCR.

In this embodiment, DV data transmitted from the PC 20 is recorded on the recording medium 40 through at least one iPCR and the DV processing unit 102. MPEG2 data transmitted from the PC 20 is recorded on the recording medium 40 through at least one iPCR and the MPEG processing unit 103.

Figure 3:
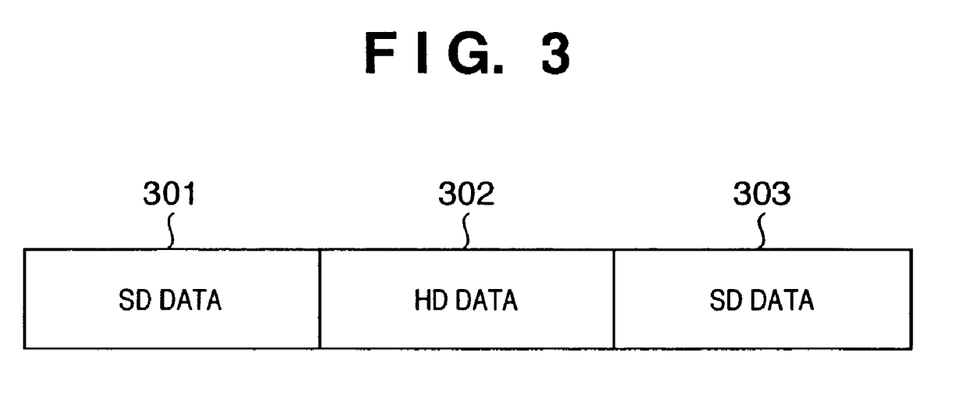
FIG. 3 is a view showing an example of a plurality of AV data recorded on a recording medium (e.g., a magnetic tape)

FIG. 3 is a view showing an example of a plurality of AV data recorded on the recording medium 40. Referring to FIG. 3, reference numerals 301 and 303 denote DV data; and 302, MPEG2 data. The DV data 301 and 303 contain video data, audio data, and their additional data. The MPEG2 data 302 contains video data, audio data, and their additional data. The resolution (image size) of the MPEG2 data 302 is higher (larger) than that of the DV data 301 and 303.

An OUTPUT PLUG SIGNAL MODE command used in this embodiment will be described next with reference to FIG. 4. The OUTPUT PLUG SIGNAL MODE command is one of commands which are transmitted from the PC 20 to the DVC 10. This command locks or unlocks one or all oPCRs to a desired data format. The OUTPUT PLUG SIGNAL MODE command is transmitted from the PC 20 to the DVC 10 by FCP (Function Control Protocol) defined by IEC 61883-1. The PC 20 can set each OPCR of the DVC 10 in a locked or unlocked state by using the OUTPUT PLUG SIGNAL MODE command.

Figure 4:
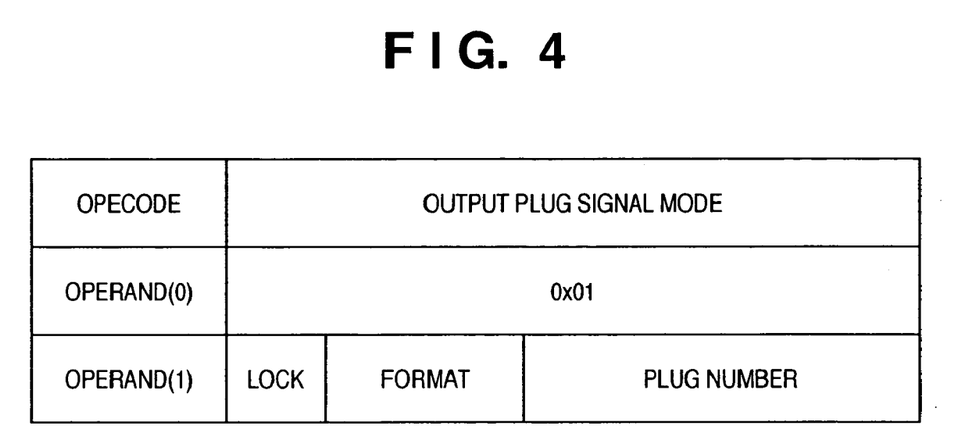
FIG. 4 is a view for explaining an OUTPUT PLUG SIGNAL MODE command.

Referring to FIG. 4, an OPECODE field stores a code indicating the OUTPUT PLUG SIGNAL MODE. An OPERAND(0) field stores "0x01". An OPERAND(1) field includes a lock field (LOCK), format field (FORMAT), and plug number field (PLUG NUMBER). If data which can be output from the DVC 10 can take four or more kinds of data formats, an OPERAND(2) field may be prepared in the OUTPUT PLUG SIGNAL MODE command, and a format field may be formed wholly or partially in the OPERAND(2) field.

The lock field stores a code (1 bit) indicating lock or unlock. When the code stored in the lock field is "1", the OUTPUT PLUG SIGNAL MODE command is an output lock command. When the code stored in the lock field is "0", the OUTPUT PLUG SIGNAL MODE command is an output unlock command. An output lock command indicates that the data format of data output from one or all oPCRs designated by the command is locked to a data format designated by the command. An output unlock command indicates that the data format of data output from one or all oPCRs designated by the command is not locked to one data format.

The format field stores a code (2 bits) indicating the data format to be locked. In this embodiment, when the data format to be locked is the DV format, "01" is stored in this field. When the data format to be locked is the MPEG2 format, "10" is stored in this field. When the OUTPUT PLUG SIGNAL MODE command is the unlock command, the format field is neglected.

The plug number field stores a code (5 bits) indicating the plug number of an oPCR to be locked or unlocked. To lock or unlock all oPCRs, all "1"s are stored in the plug number field.

For example, to lock the oPCR of plug number 0 to the DV format, the OPERAND(1) field of the output lock command stores "0xA0". To lock the oPCR of plug number 1 to the MPEG2 format, the OPERAND(1) field of the output lock command stores "0xC1".

An INPUT PLUG SIGNAL MODE command used in this embodiment will be described next with reference to FIG. 5. The INPUT PLUG SIGNAL MODE command is one of commands which are transmitted from the PC 20 to the DVC 10. This command locks or unlocks one or all iPCRs to a desired data format. The INPUT PLUG SIGNAL MODE command is transmitted from the PC 20 to the DVC 10 by FCP, like the OUTPUT PLUG SIGNAL MODE command.

The PC 20 can set each iPCR of the DVC 10 in a locked or unlocked state by using the INPUT PLUG SIGNAL MODE command.

Figure 5:
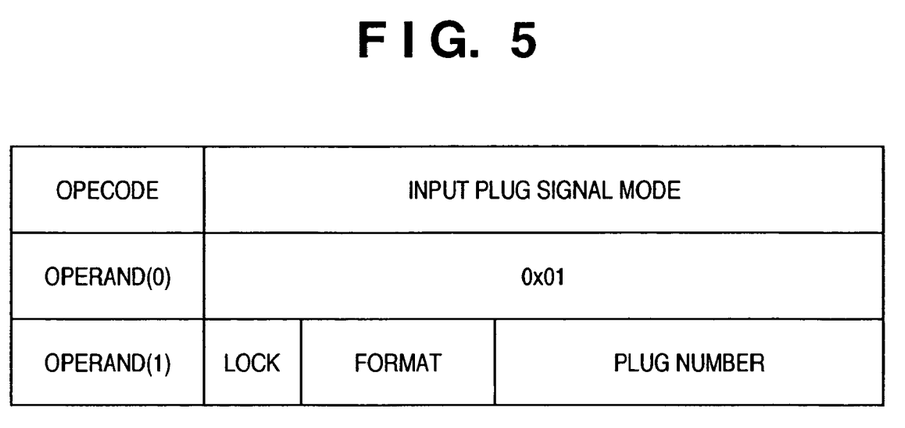
FIG. 5 is a view for explaining an INPUT PLUG SIGNAL MODE command.

Referring to FIG. 5, an OPECODE field stores a code indicating the INPUT PLUG SIGNAL MODE. An OPERAND(0) field stores "0x01". An OPERAND(1) field includes a lock field (LOCK), format field (FORMAT), and plug number field (PLUG NUMBER). If data which can be input to the DVC 10 can take four or more kinds of data formats, an OPERAND(2) field may be prepared in the INPUT PLUG SIGNAL MODE command, and a format field may be formed wholly or partially in the OPERAND(2) field.

The lock field stores a code (1 bit) indicating lock or unlock. When the code stored in the lock field is "1", the INPUT PLUG SIGNAL MODE command is an input lock command. When the code stored in the lock field is "0", the INPUT PLUG SIGNAL MODE command is an input unlock command. An input lock command indicates that the data format of data input to one or all iPCRs designated by the command is locked to a data format designated by the command. An input unlock command indicates that the data format of data input to one or all iPCRs designated by the command is not locked to one data format.

The format field stores a code (2 bits) indicating the data format to be locked. In this embodiment, when the data format to be locked is the DV format, "01" is stored in this field. When the data format to be locked is the MPEG2 format, "10" is stored in this field. When the INPUT PLUG SIGNAL MODE command is the unlock command, the format field is neglected.

The plug number field stores a code (5 bits) indicating the plug number of an iPCR to be locked or unlocked. To lock or unlock all iPCRS, all "1"s are stored in the plug number field.

For example, to lock the iPCR of plug number 0 to the DV format, the OPERAND(1) field of the input lock command stores "0xA0". To lock the iPCR of plug number 1 to the MPEG2 format, the OPERAND(1) field of the input lock command stores "0xC1".

Figure 6:
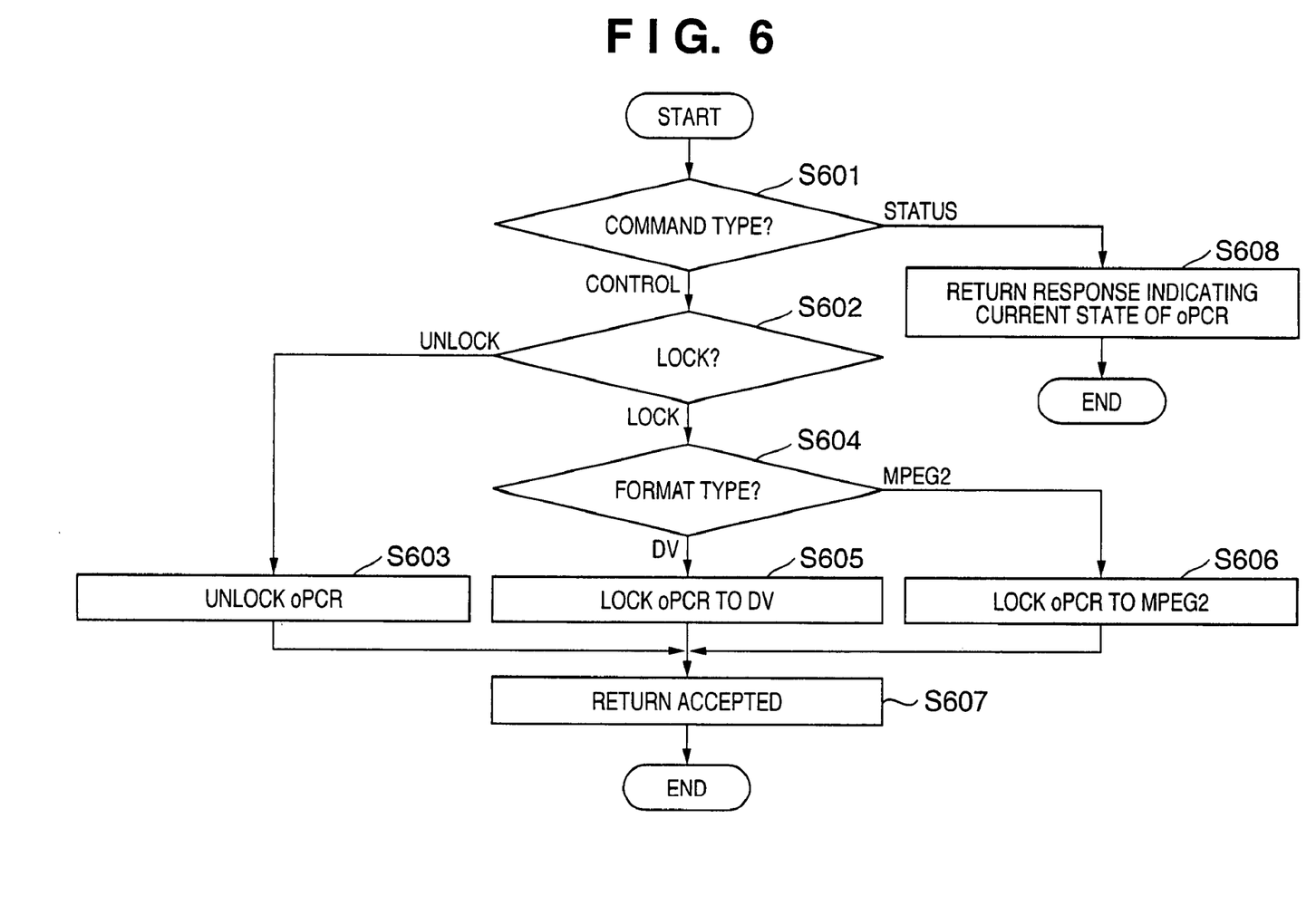
FIG. 6 is a flowchart for explaining the processing procedures of the video processing apparatus upon receiving the OUTPUT PLUG SIGNAL MODE command.

Processing procedures executed by the DVC 10 will be described next with reference to FIG. 6. FIG. 6 is a flowchart for explaining the processing procedures of the DVC 10 upon receiving the OUTPUT PLUG SIGNAL MODE command transmitted from the PC 20. The processing procedures shown in FIG. 6 indicate processing controlled by the control unit 105 in accordance with a predetermined program.

In step S601, the control unit 105 determines the type (command type) of the OUTPUT PLUG SIGNAL MODE command transmitted from the PC 20. The type of the OUTPUT PLUG SIGNAL MODE command can be determined by ctype defined by "AV/C Digital Interface Command Set General Specification Version 4.0, 1394 Trade Association". If the OUTPUT PLUG SIGNAL MODE command is a control command, the flow advances to step S602. If the OUTPUT PLUG SIGNAL MODE command is a status command, the flow advances to step S608.

In step S602, the control unit 105 determines whether the OUTPUT PLUG SIGNAL MODE command is an output lock command. If the OUTPUT PLUG SIGNAL MODE command is an output lock command, the flow advances to step S604. If the OUTPUT PLUG SIGNAL MODE command is an output unlock command, the flow advances to step S603.

In step S603, the control unit 105 unlocks the oPCR designated by the OUTPUT PLUG SIGNAL MODE command. That is, AV data output from the oPCR designated by the OUTPUT PLUG SIGNAL MODE command is not locked to one data format. Accordingly, DV data and MPEG2 data can be output from this oPCR.

In step S604, the control unit 105 determines the type (format type) of the data format designated by the OUTPUT PLUG SIGNAL MODE command. If the designated data format is the DV format, the flow advances to step S605. If the designated data format is the MPEG2 format, the flow advances to step S606.

In step S605, the control unit 105 locks the oPCR designated by the OUTPUT PLUG SIGNAL MODE command to the DV format. That is, AV data output from the oPCR designated by the OUTPUT PLUG SIGNAL MODE command is locked to the DV format. Accordingly, only DV data is output from this oPCR. Hence, when AV data other than DV data played back from the recording medium 40 is supplied to the oPCR locked to the DV format, the IEEE 1394 interface 104 outputs not the AV data but only a CIP header indicating the DV format to the IEEE 1394 serial bus 30. The structure of the CIP header is described in detail in IEC 61883-1, IEC 61883-2, IEC 61883-3, IEC 61883-4, and IEC 61883-5, and a description thereof will be omitted.

In step S606, the control unit 105 locks the oPCR designated by the OUTPUT PLUG SIGNAL MODE command to the MPEG2 format. That is, AV data output from the oPCR designated by the OUTPUT PLUG SIGNAL MODE command is locked to the MPEG2 format. Accordingly, only MPEG2 data is output from this oPCR. Hence, when AV data other than MPEG2 data played back from the recording medium 40 is supplied to the oPCR locked to the MPEG2 format, the IEEE 1394 interface 104 outputs not the AV data but only a CIP header indicating the MPEG2 format to the IEEE 1394 serial bus 30.

In step S607, the control unit 105 returns a response indicating ACCEPTED to the PC 20. The response indicating ACCEPTED represents that the OUTPUT PLUG SIGNAL MODE command is normally received.

In step S608, the control unit 105 returns, to the PC 20, a response indicating the current state of the oPCR designated by the plug number field of the OUTPUT PLUG SIGNAL MODE command. The response returned to the PC 20 contains a code indicating whether the oPCR designated by the OUTPUT PLUG SIGNAL MODE command is locked, and if the oPCR is locked, a code indicating the locked data format.

Figure 7:
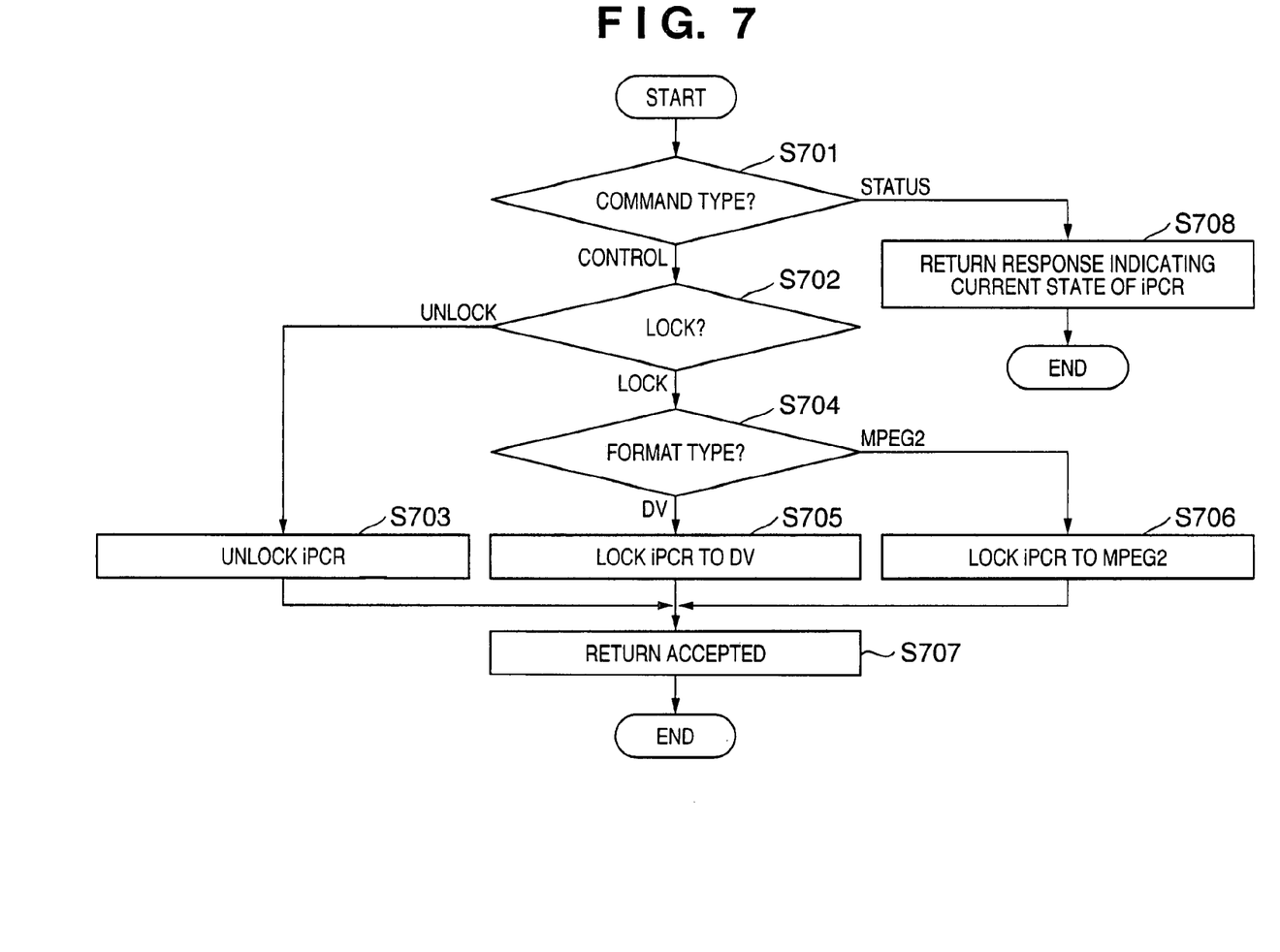
FIG. 7 is a flowchart for explaining the processing procedures of the video processing apparatus upon receiving the INPUT PLUG SIGNAL MODE command.

Processing procedures executed by the DVC 10 will be described next with reference to FIG. 7. FIG. 7 is a flowchart for explaining the processing procedures of the DVC 10 upon receiving the INPUT PLUG SIGNAL MODE command transmitted from the PC 20. The processing procedures shown in FIG. 7 indicate processing controlled by the control unit 105 in accordance with a predetermined program.

In step S701, the control unit 105 determines the type (command type) of the INPUT PLUG SIGNAL MODE command transmitted from the PC 20. The type of the INPUT PLUG SIGNAL MODE command can be determined by ctype defined by "AV/C Digital Interface Command Set General Specification Version 4.0, 1394 Trade Association". If the INPUT PLUG SIGNAL MODE command is a control command, the flow advances to step S702. If the INPUT PLUG SIGNAL MODE command is a status command, the flow advances to step S708.

In step S702, the control unit 105 determines whether the INPUT PLUG SIGNAL MODE command is an input lock command. If the INPUT PLUG SIGNAL MODE command is an input lock command, the flow advances to step S704. If the INPUT PLUG SIGNAL MODE command is an input unlock command, the flow advances to step S703.

In step S703, the control unit 105 unlocks the iPCR designated by the INPUT PLUG SIGNAL MODE command. That is, AV data input to the iPCR designated by the INPUT PLUG SIGNAL MODE command is not locked to one data format. Accordingly, DV data and MPEG2 data can be input to this iPCR.

In step S704, the control unit 105 determines the type (format type) of the data format designated by the INPUT PLUG SIGNAL MODE command. If the designated data format is the DV format, the flow advances to step S705. If the designated data format is the MPEG2 format, the flow advances to step S706.

In step S705, the control unit 105 locks the iPCR designated by the INPUT PLUG SIGNAL MODE command to the DV format. That is, AV data input to the iPCR designated by the INPUT PLUG SIGNAL MODE command is locked to the DV format. Accordingly, only DV data can be input to this iPCR.

In step S706, the control unit 105 locks the iPCR designated by the INPUT PLUG SIGNAL MODE command to the MPEG2 format. That is, AV data input to the iPCR designated by the INPUT PLUG SIGNAL MODE command is locked to the MPEG2 format. Accordingly, only MPEG2 data can be input to this iPCR.

In step S707, the control unit 105 returns a response indicating ACCEPTED to the PC 20. The response indicating ACCEPTED represents that the INPUT PLUG SIGNAL MODE command is normally received.

In step S708, the control unit 105 returns, to the PC 20, a response indicating the current state of the iPCR designated by the plug number field of the INPUT PLUG SIGNAL MODE command. The response returned to the PC 20 contains a code indicating whether the iPCR designated by the INPUT PLUG SIGNAL MODE command is locked, and if the iPCR is locked, a code indicating the locked data format.

As described above, according to this embodiment, the data format of output data output from one of the logical output terminals (oPCR) of the video processing apparatus (DVC 10) can be locked to one data format (DV format or MPEG2 format).

According to this embodiment, the data format of output data output from one of the logical output terminals (oPCR) of the video processing apparatus (DVC 10) can be prevented from being locked to one data format (DV format or MPEG2 format).

According to this embodiment, the data format of input data input to one of the logical input terminals (iPCR) of the video processing apparatus (DVC 10) can be locked to one data format (DV format or MPEG2 format).

According to this embodiment, the data format of input data input to one of the logical input terminals (iPCR) of the video processing apparatus (DVC 10) can be prevented from being locked to one data format (DV format or MPEG2 format).

The object of the present invention can also be achieved by supplying a storage medium which stores software program codes for implementing the functions of the above-described embodiment to a system or apparatus and causing the computer (or a CPU or MPU) of the system or apparatus to read out and execute the program codes stored in the storage medium.

In this case, the program codes read out from the storage medium implement the functions of the above-described embodiment by themselves, and the program codes themselves and the storage medium which stores them constitute the present invention.

As the storage medium for supplying the program codes, for example, a flexible disk, hard disk, optical disk, magnetooptical disk, CD-ROM, CD-R, magnetic tape, nonvolatile memory card, ROM, or the like can be used.

The functions of the above-described embodiment are implemented not only when the readout program codes are executed by the computer but also when the OS (fundamental system or operating system) running on the computer performs part or all of actual processing on the basis of the instructions of the program codes.

The functions of the above-described embodiment are also implemented when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

INDUSTRIAL APPLICABILITY

The present invention is not limited to the above-described embodiment and can also be applied to various embodiments. For example, the transmission medium in the above-described embodiment is not limited to the IEEE 1394 serial bus. The IEEE 1394 serial bus can be replaced with another transmission medium (e.g., a USB). The USB is described in detail in "Universal Serial Bus Specification Revision 2.0, Apr. 27, 2000".

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2003-420201 filed on Dec. 17, 2003, the entire contents of which are incorporated herein by reference.

The invention claimed is:

1. A video processing apparatus, comprising:
an output terminal, wherein the output terminal corresponds to an oPCR (output Plug Control Register) defined by IEC 61883-1;
a reception unit that receives a first command and a second command from a control apparatus, wherein the first command is for locking a data format of the output terminal to a predetermined data format, and the second command is for not locking the data format of the output terminal to the predetermined data format; and
a control unit that controls whether to lock the data format of the output terminal to the predetermined data format, wherein the control unit controls to lock the data format of the output terminal to the predetermined data format so that the output terminal cannot output data whose data format is different from the predetermined data format if the first command is received by the reception unit,
wherein the control unit controls not to lock the data format of the output terminal to the predetermined data format so that the output terminal can output both data whose data format is the predetermined data format and data whose data format is different from the predetermined data format if the second command is received by the reception unit, and
wherein the predetermined data format is one of DV format and MPEG2 format.

2. The video processing apparatus according to claim 1, wherein the output terminal is a logical output terminal.

3. A method of controlling a video processing apparatus, the video processing apparatus including an output terminal, the method comprising:

a reception step of receiving a first command and a second command from a control apparatus, wherein the first command is for locking a data format of the output terminal to a predetermined data format, and the second command is for not locking the data format of the output terminal to the predetermined data format;

a first control step of controlling to lock the data format of the output terminal to the predetermined data format so that the output terminal cannot output data whose data format is different from the predetermined data format if the first command is received in the reception step; and a second control step of controlling not to lock the data format of the output terminal to the predetermined data format so that the output terminal can output both data whose data format is the predetermined data format and data whose data format is different from the predetermined data format if the second command is received in the reception step, wherein the output terminal corresponds to an oPCR (output Plug Control Register) defined by IEC 61883-1, and wherein the predetermined data format is one of DV format and MPEG2 format.

4. The method according to claim 3, wherein the output terminal is a logical output terminal.

* * * * *